US006284995B1

(12) United States Patent
Esslinger et al.

(10) Patent No.: US 6,284,995 B1
(45) Date of Patent: Sep. 4, 2001

(54) EXPANDABLE, AUTOMATED, WELDING DEVICE FOR THE BUILD UP OF MATERIAL

(75) Inventors: Erik Nathan Esslinger, Charlestown; Thomas H. Esslinger, Acworth, both of NH (US)

(73) Assignee: Bore Repair Systems, Inc., Alstead, NH (US)

( * ) Notice: Subject to any disclaimer, the term of this patent is extended or adjusted under 35 U.S.C. 154(b) by 0 days.

(21) Appl. No.: 09/314,722

(22) Filed: May 18, 1999

(51) Int. Cl.[7] ....................................................... B23K 9/04
(52) U.S. Cl. ..................................... 219/76.14; 219/125.11
(58) Field of Search ............................. 219/125.11, 125.1, 219/127, 136, 137 R, 76.14, 137.63

(56) References Cited

U.S. PATENT DOCUMENTS

| | | | |
|---|---|---|---|
| 3,430,837 | * 3/1969 | Hein | 219/136 |
| 3,541,298 | * 11/1970 | Carkhuff | 219/137.63 |
| 3,594,534 | * 7/1971 | Benfield | 219/125.11 |
| 3,627,973 | * 12/1971 | Smith | 219/125.1 |
| 4,381,440 | * 4/1983 | Madewell | 219/125.11 |
| 4,527,039 | 7/1985 | Füwesi | 219/76.14 |
| 4,687,899 | 8/1987 | Acheson | 219/76.14 |
| 4,805,826 | 2/1989 | Moriki | 228/18 |
| 4,851,639 | 7/1989 | Sugitani | 219/125.11 |
| 4,873,419 | 10/1989 | Acheson | 219/125.1 |
| 4,892,990 | 1/1990 | Acheson | 219/76.14 |
| 4,952,769 | 8/1990 | Acheson | 219/76.14 |
| 4,956,540 | * 9/1990 | Kohno et al. | 219/127 |
| 5,298,710 | 3/1994 | Acheson et al. | 219/76.14 |
| 5,558,268 | * 9/1996 | Acheson | 219/125.11 |
| 5,844,201 | * 12/1998 | Dibacco et al | 219/136 |

* cited by examiner

Primary Examiner—Clifford C. Shaw
(74) Attorney, Agent, or Firm—Davis & Bujold, P.L.L.C.

(57) ABSTRACT

This invention relates to the art of machine repair. The present invention relates to an expandable, automated, welding device and methods used to build up material on the inner surface of a bore so that the bore can be restored to original working order. More particularly, the invention relates to the welding and repair of bearing or bore surfaces. The present invention is designed to allow easy setup and use through means of easy adjustment of the apparatus through manual adjustment of the significant positioning parameters, simple linear controls to adjust process parameters of the buildup process, and, relatively small in size. Moreover, the device allows for easy expansion of the welding torch allowing for a very broad range of engagement sizes. The present invention has a compressed air cooling means to prevent operation failure under high temperature conditions. Furthermore, a non-conductive coating has been applied to the welding torch making it less prone to damage, and safer to operate. Finally, the presentinvention's clutch control mechanism can be locked to allow for single plane welds such as face welds.

20 Claims, 12 Drawing Sheets

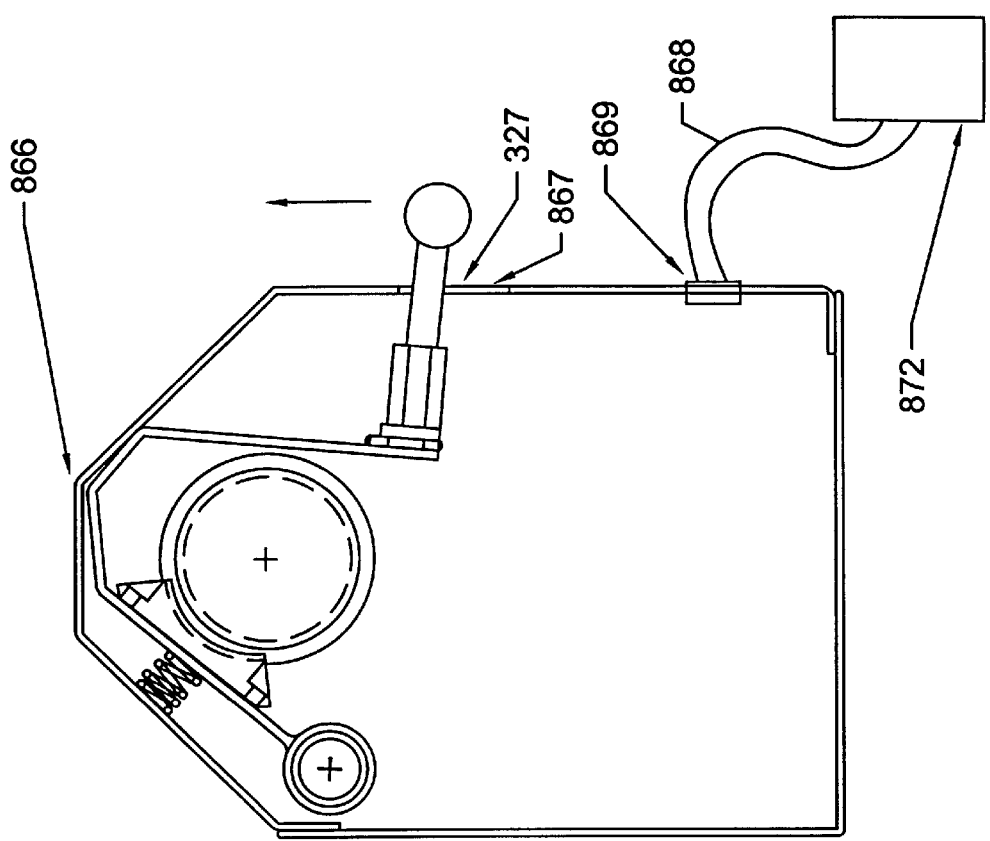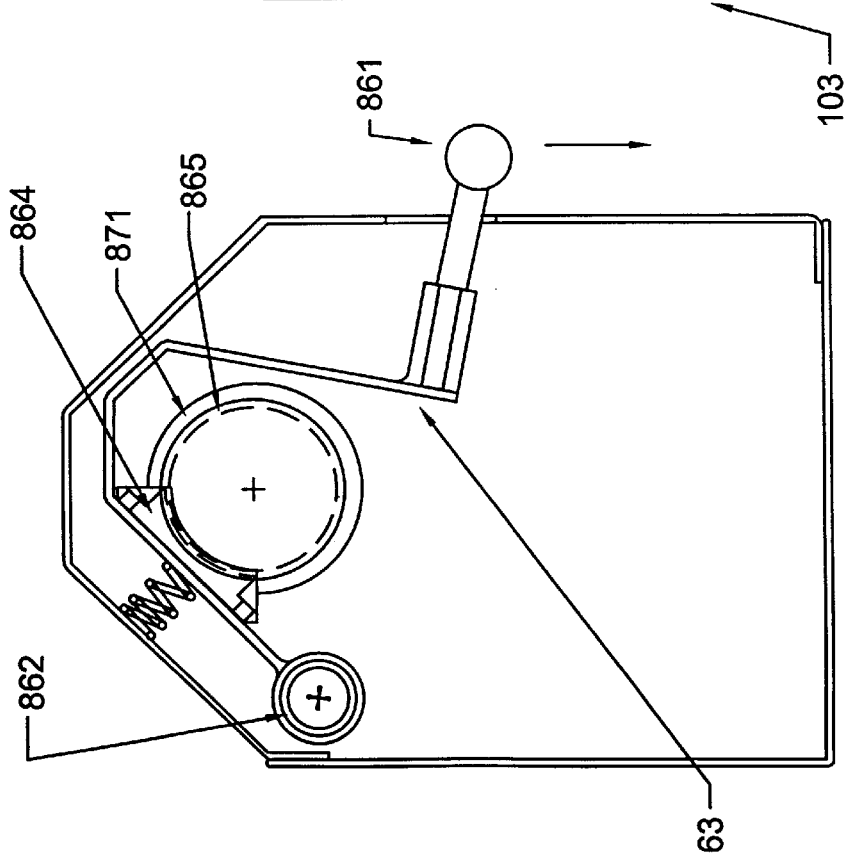

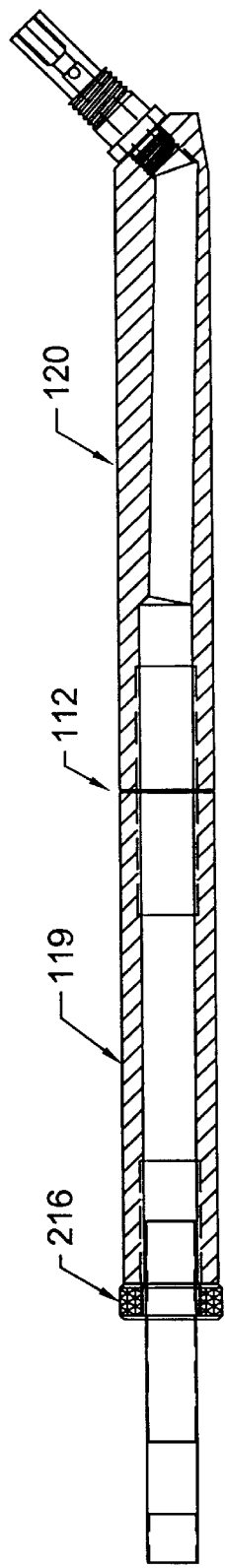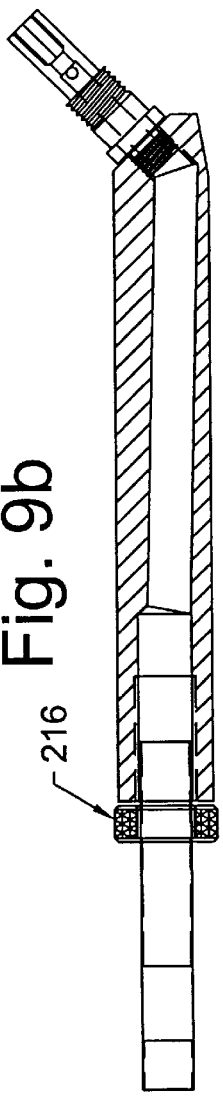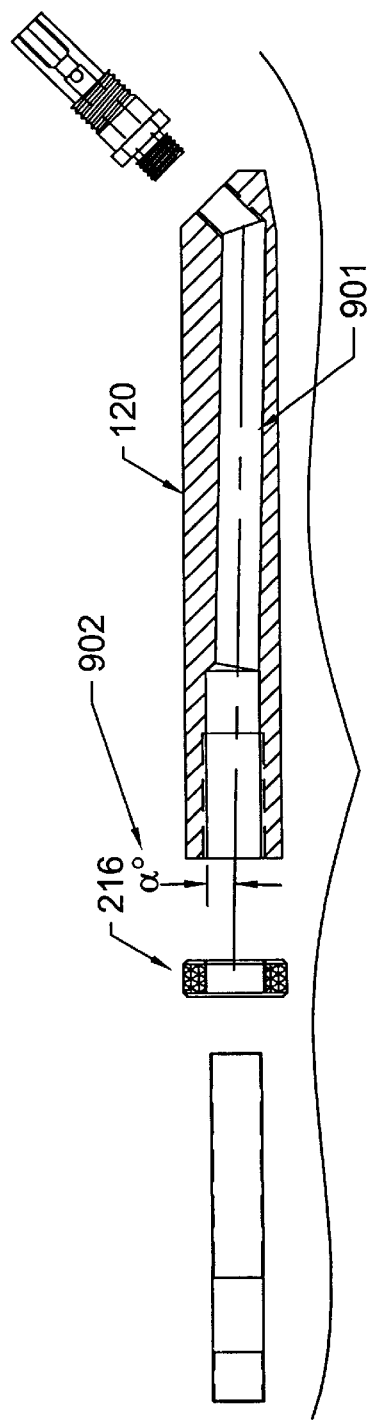

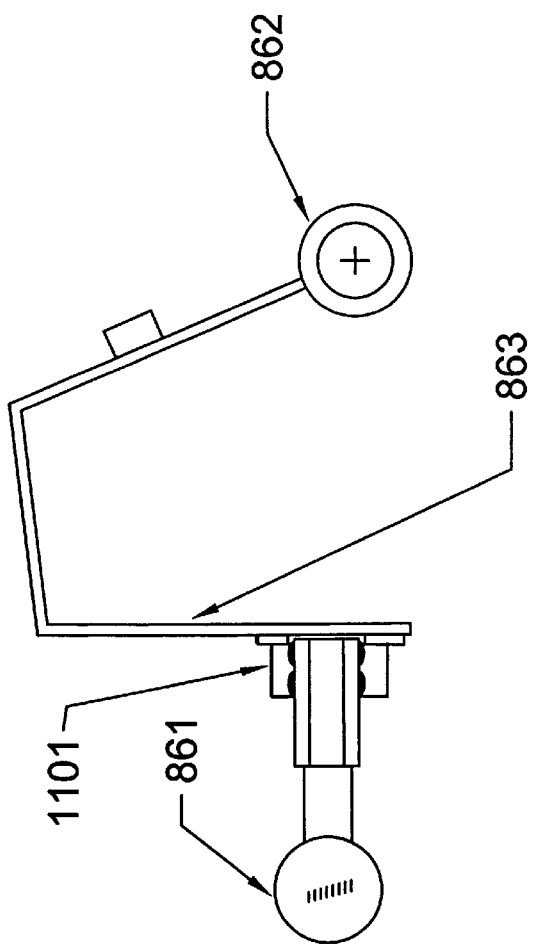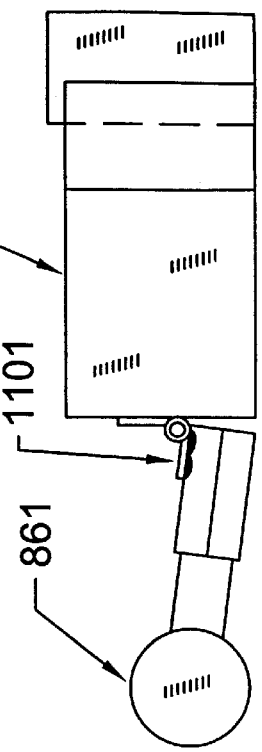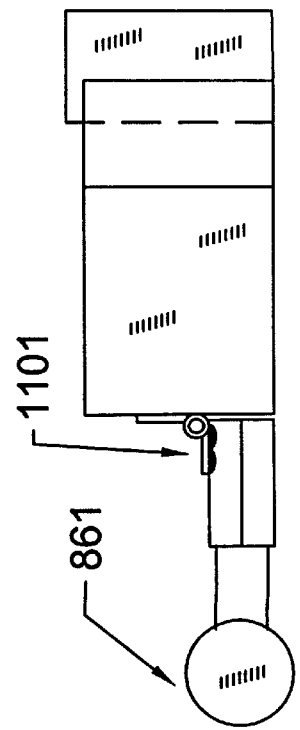

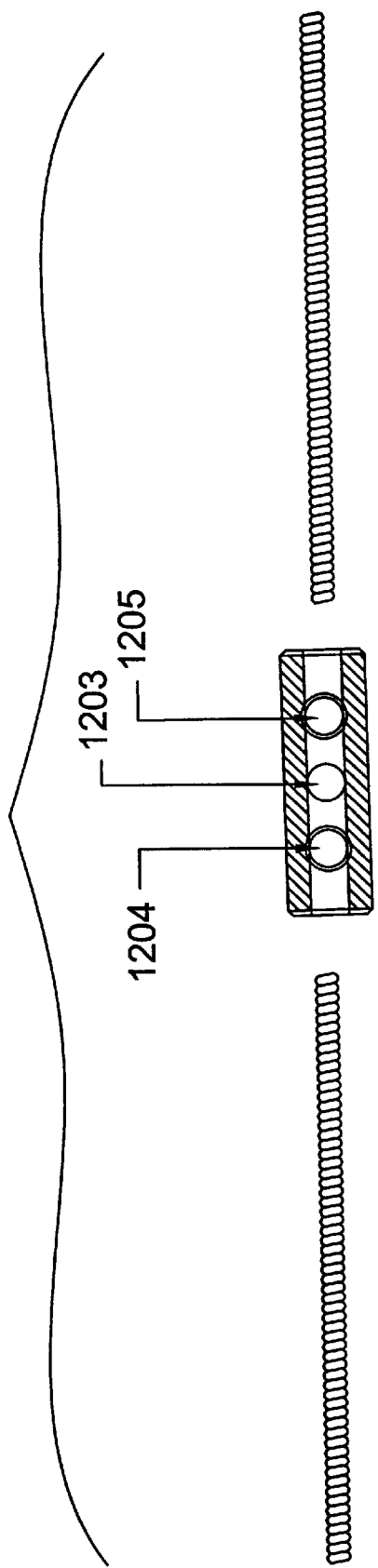

EXPANDABLE, AUTOMATED, WELDING DEVICE FOR THE BUILD UP OF MATERIAL

The present invention is continuation-in-part of U.S. Patent application Ser. No. 09/421,206 filed Jul. 21, 1998, which claims priority from provisional application Ser. No. 60/053,388, Jul. 22, 1997.

FIELD OF THE INVENTION

This invention relates to the art of machine repair. More particularly, the invention is related to the welding and repair of beating or bore surfaces.

BACKGROUND OF THE INVENTION

A wide variety of machinery exists in working conditions throughout the world and is exposed to abrasive and stressful conditions. Large work loads, open and corrosive conditions and time all work to wear out bearing surfaces and require replacement and or repair. For large bearing surfaces, there is often a need to buildup material in the inner surface of a bearing bore. Various attempts have been made to provide automated machinery for depositing welding beads in a uniform manner on the inner bores of bearing journals.

For instance, U.S. Pat. No. 4,527,039 to Fuwesi teaches and apparatus and method for restoring the surfaces blind or through surfaces of metallic workpieces. Fuwesi teaches a method be which tools, including welding torches, can be connected to a rotating spindle. The effective radii of rotational movement of the welding torch in Fuwesi is fixed by combination of a length of the welding attachment itself, and the spindle mechanism. Fuwesi does not disclose a manually adjustable axial positioning mechanism.

U.S. Pat. No. 4,687,899 issued to Acheson teaches an apparatus for restoring the inner surfaces of bores in metallic workpieces that has an adjustment means that relies on fixed pieces connected with a gear mechanism for adjusting the effective radii of the welding torch. This mechanism will be either quite large or will have a small range of adjustable radii. As another embodiment Acheson's apparatus, there is provided two part mechanism for adjusting the radius of the welding arm, a radial arm and an arm parallel to the axis of rotation of the axis of the apparatus. It is clear that Acheson requires several embodiments of the device in order to provide a wide range of radii.

U.S. Pat. No. 5,298,710 issued to Acheson also teaches an apparatus for building up material in a large bore of a metallic workpiece. In developing the Acheson technology of previous patents, including U.S. Pat. Nos. 4,873,419; 4,892,990; and 4,925,769; Acheson has relied upon additional setups to provide a greater radii range and has developed and claimed a specific method of sweeping the inner bore that sweeps approximately 359 degrees and then makes a step, effectively equal to the welding bead.

Each of the systems is complicated and requires careful attention to setup parameters in order to insure proper operation. The typical trend has been to make devices that are capable of doing many operations, including building up bore surfaces and little attention has been paid to providing equipment that is responsive to the needs and conditions imposed by day to day operations. However, none of the prior art references are specifically configured to be easy to set up in the field, their primary working condition. Each of the systems is complicated and requires careful attention to setup parameters in order to insure proper operation.

SUMMARY OF THE INVENTION

The present invention is designed to allow easy setup and use through means of easy adjustment of the apparatus through manual adjustment of the significant positioning parameters, simple linear controls to adjust process parameters of the buildup process, and, be relatively small in size. The present invention relates to an expandable, automated, welding device and methods used to build up material on the inner surface of a bore so that the bore can be restored to original working order.

The apparatus is characterized in having various improvements over the state of the art devices specifically including an expandable welding extension arm that has a first hollow arm and a expandable welding torch joined with a swivel bearing that allows radial adjustment of an expandable welding torch nozzle that extends from an expandable hollow arm. The apparatus is further characterized in having a unitary mechanical mechanism that coordinates the rotation of the expandable welding extension arm and the axial movement of the expandable welding torch; a manually releasable mechanism for adjusting the initial radial position of the welding arm and readjustment of the same; and a conductive path that provides current flow in external portion of the device is limited to the first hollow arm, the swivel bearing means, and the expandable welding torch. The welding torch is coated with a non-conductive material resulting in a more reliable, effective, longer lasting, and safer device. Further, the present invention joins a threaded guide and an extension tube by a spindle ferrule clamp. This hollow extension tube passes through a control housing that rotates the extension tube assembly by motor and pulley means, thereby effectuating the rotation of the first arm, and the welding arm. The apparatus also employs a compressed air means to force cool air through an air line, into the control housing. The cool air allows the present invention to be used in hostile or hot conditions. The air cooling results in a device that is more reliable.

The method of welding to build up material with automated welding apparatus comprises the steps of: clamping the apparatus to a fixed surface and in position as desired; positioning manually the apparatus axially in line with a radial axis of a desired working surface; adjusting the adjustable support bracket means; disengaging a clutch mechanism; positioning manually and axially an extension tube to a desired length; engaging the clutch mechanism; attaching additional expandable hollow arm segments to an expandable welding torch for additional length as required; expanding manually the radial reach of the expandable welding torch to a desired length; disposing manually and radically and expandable welding torch to a desired length; positioning manually the expandable welding torch of the apparatus near a desired surface; providing and coupling manually a power, wire, and gas source; selecting a rotational direction by engaging a directional controller; selecting a rotational speed by engaging a rotation speed controller; selecting a state of engagement for a clutch control mechanism; engaging the expandable welding torch; manipulating the clutch control mechanism as desired; disengaging the expandable welding torch.

It is an object of the invention to provide an expandable device for uniformly building up the inner surface of a bore, which is easy to setup.

It is a further object of the invention to provide an expandable apparatus that provides a uniform buildup of material on the inner surface of a bore.

It is also an object of the invention to provide an expandable apparatus for the buildup of material that is easy to position and reposition or to change direction of the movement of the apparatus along an axis.

It is also an object of the invention to provide an expandable apparatus that will create a spiral buildup mechanism, simple manual axial position adjustment, and simple manual radial adjustment.

It is also an object of the invention to provide an easily expandable welding torch.

It is also an object of the invention to provide externally non-conductive welding torch.

It is also an object of the invention to provide an apparatus capable of performing single plane welds.

It is also an object of the invention to provide an expandable apparatus capable of operating in high temperatures.

BRIEF DESCRIPTION OF THE DRAWING

In the drawing,

FIG. 8A A diagrammatic top plan view of the control box with the clutch mechanism illustrated in the engaged state.

FIG. 8B A diagrammatic top plan view of the control box with the clutch mechanism illustrated in the disengaged state.

FIG. 9A A diagrammatic cross-sectional view of the expandable hollow arm, the manual locking member and the diffuser shown in an assembled state.

FIG. 9B A diagrammatic cross-sectional view of the manual locking coupler and the diffuser.

FIG. 9C A diagrammatic exploded cross-sectional view of the diffuser, the torch, the torch locking nut and the torch adapter.

FIG. 11A A diagrammatic top plan view of the clutch controller, the clutch controller hinge and the control arm.

FIG. 11B A diagrammatic front elevational view of FIG. 11 shown in the operative position.

FIG. 11C A diagrammatic front elevational view of FIG. 11 shown in the inoperative position.

FIG. 12A An exploded diagrammatic cross-sectional view of a liner coupler for coupling two wire guide liners with one another.

FIG. 12B A diagrammatic cross-sectional view showing coupling of two wire guide lines with one another via the liner coupler.

DETAILED DESCRIPTION

Figure 1:
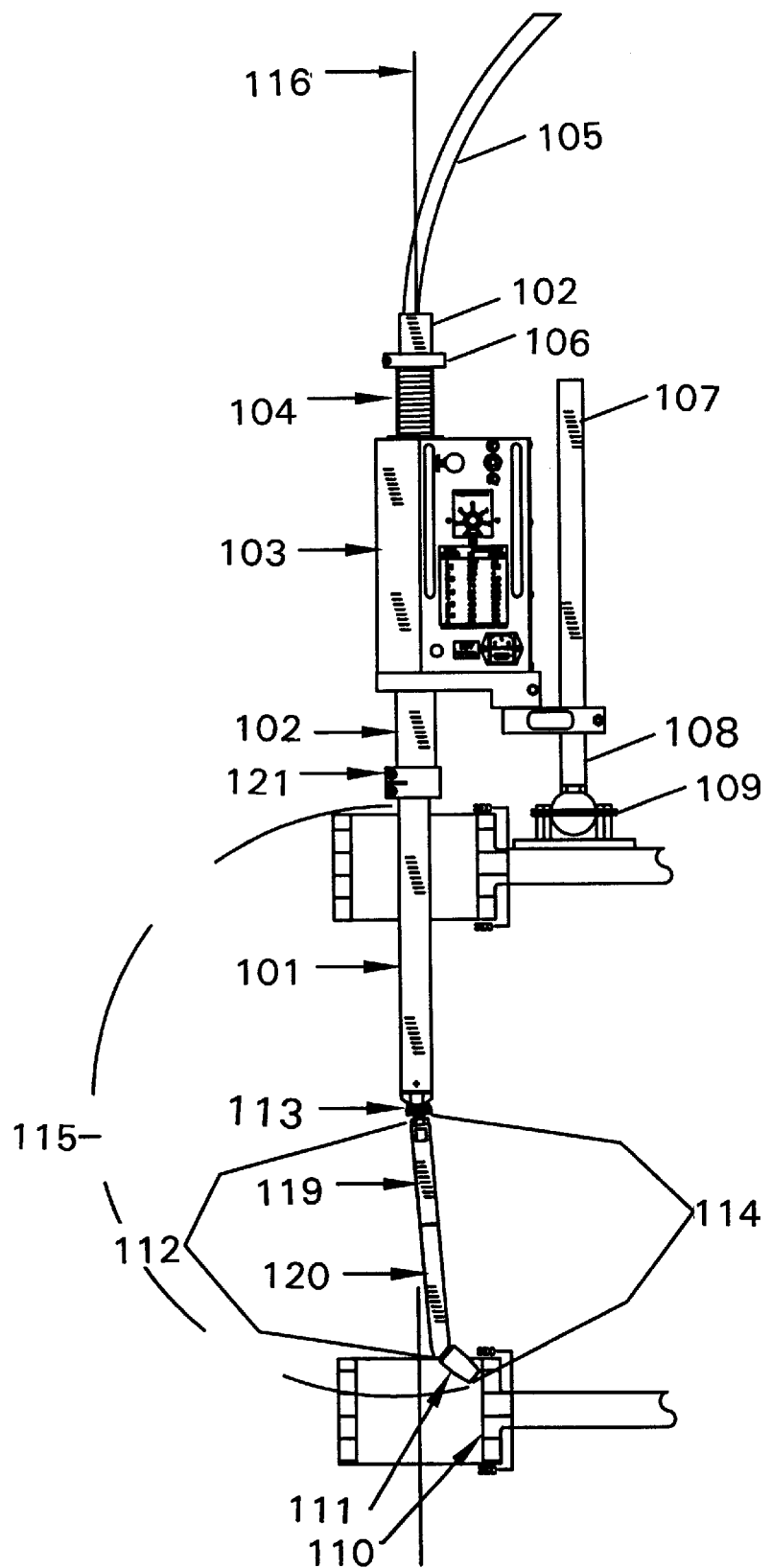
FIG. 1 A three-quarters view of one embodiment of the present invention clamped a bore.

As can be seen in FIG. 1, the present invention is an apparatus for providing a uniform welding bead on a desired surface of a circular bore 110 or single plane. The device is comprised of several elements. An expandable welding extension arm 115 is comprised of a first hollow arm 101 rotatable along a radial axis 116; a swivel bearing means 113 attached at a first point to the first hollow arm aligned on said radial axis; and an expandable welding torch 114. The expandable welding torch is comprised of an expandable hollow arm 112 attached to a second point of the swivel bearing means so as to be disposed away from said radial axis; and a nozzle 111. Further, this expandable hollow arm is further comprised of expandable hollow arm segments 119, 120 that allows a field operator to manually, quickly, cheaply, and effectively expand or reduce the radial reach of the apparatus by attaching or removing additional expandable hollow arm segments in the work environment. The expandable hollow arm is comprised of a first hollow arm segment, wherein the first hollow arm segment is selected from the group consisting of an intermediate expandable hollow arm segment, and a final expandable hollow arm segment. An intermediate expandable hollow arm segment 119 can be joined to the last expandable hollow arm segment 120, or to another intermediate expandable arm segment 119; the intermediate expandable arm segments can be attached to one another, end to end, to further extend the radial reach of the torch arm; the last expandable hollow arm segment can be attached to either the last most intermediate expandable hollow arm segment or directly to the second point of the swivel bearing means. This simple mechanism allows an operator in the field to adjust the mechanism to work in bores of varying radii. The operator will align the axis of the first hollow arm along the desired axis of the bore and placing the nozzle 111 of a expandable welding torch 114 at the starting point of the bore where material is to be built up. Adjustment of the effective radii of the apparatus is achieved by swinging the expandable hollow arm at a swivel bearing means 113 and positioning the nozzle of the expandable welding torch in working proximity of the bore surface. Moreover, the effective radii of the expandable welding torch can be significantly expanded or reduced by adding or removing expandable hollow arm segments.

The first hollow arm is clamped by a second clamp 121 to an extension tube 102. The extension tube extends through a housing control unit 103 and threaded guide 104. A spindle ferrule clamp 106 clamps the threaded collar. A wire/power/gas conduit 105 extends into the extension tube.

The apparatus can be conveniently aligned with the bore by fixing a clamping means 109 to a fixed surface and then adjusting and adjustable support bracket means 107 including adjusting the effective length of a mounting rod 108. Once fixed, the radial position of the welding arm can be finely adjusted in the invention by a clutch mechanism, 322 in FIG. 3, that releases the welding carrier mechanism to be freely moved to its desired position.

The clutch mechanism engages a threaded guide 104 that controls the axial movement of the welding mechanism as the welding mechanism is rotated about its axis. Clearly, the rate of axial movement depends upon the size of the thread on said threaded guide. Those skilled in the art would find it straightforward to adjust the thread size for particular welding operations. In the practice of the present invention the screws range from 6 to 12 turns per inch. The invention may be practiced with screw dimensions outside this range as conditions might require.

Figure 3:
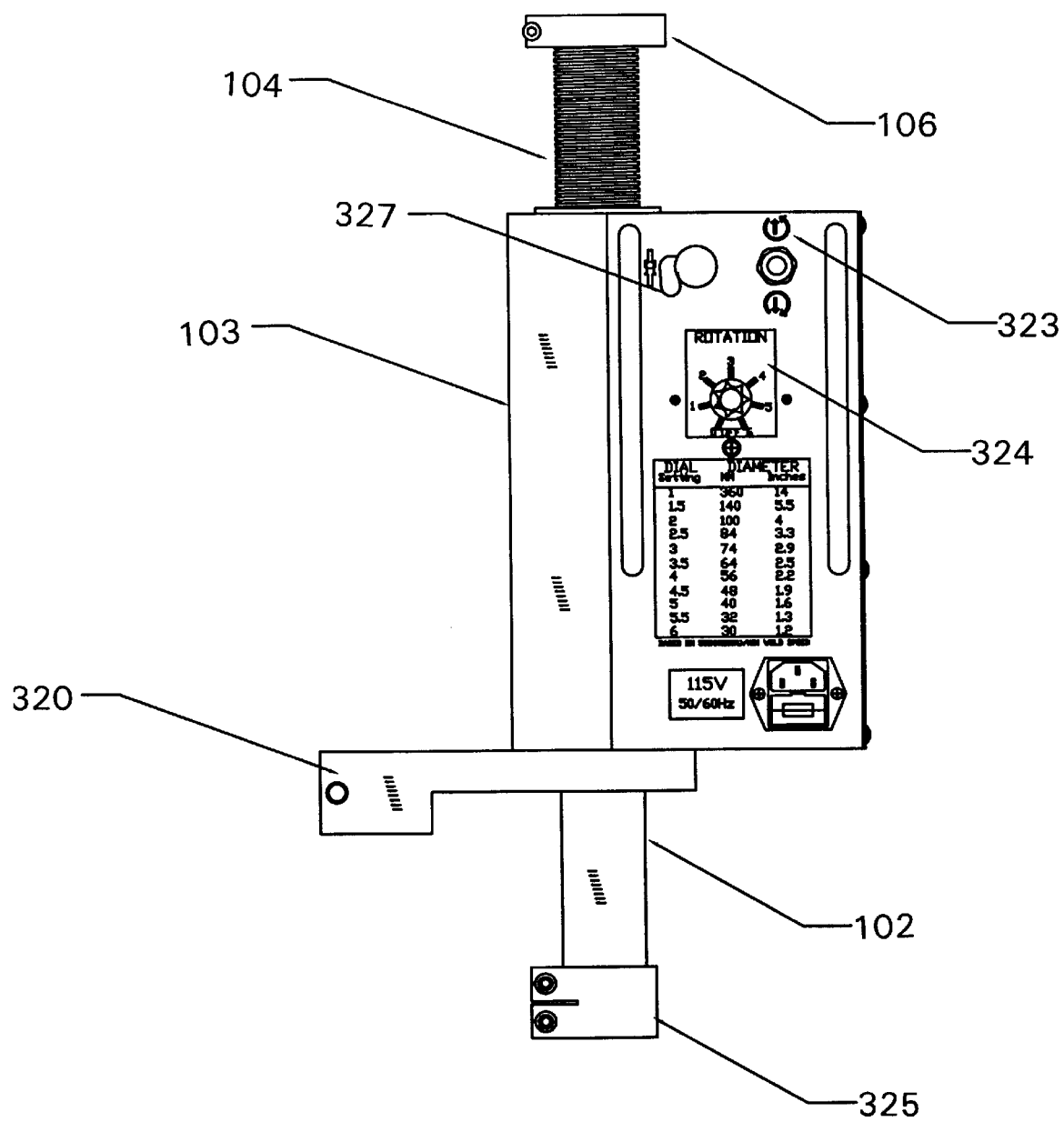
FIG. 3 A view of the upper assembly of the present invention's rotation control.

As shown in FIG. 3, the housing 103 for the control unit surrounds the extension tube 102 which extends through the control unit and carries the welding material carrier mechanism. The control box has a clutch control mechanism 322 attached to the clutch means, a rotational speed control 324 attached to the control mechanism in the controller and a directional controller 323 for moving the spindle forward or in reverse. The clutch control mechanism extends from the housing through a clutch lock 327 passage. The spindle 102 has a screw mechanism portion 326, and a portion at the opposite side of the controller 103. There may be disposed at opposing ends of the spindle, a spindle ferrule clamp or positioning means 106 and a second clamp 325 that also provides an indication of the position of the spindle. The spindle ferrule clamp once engaged will limit the position of the extension tube, and as a consequence the expandable welding torch.

Figure 10B:
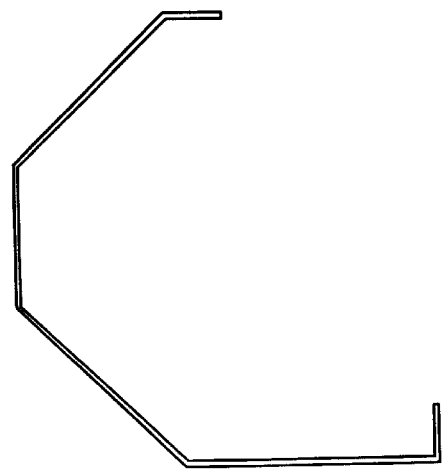
FIG. 10B A diagrammatic top plan view of the housing following completion of the bending process of the material.
Figure 10A:
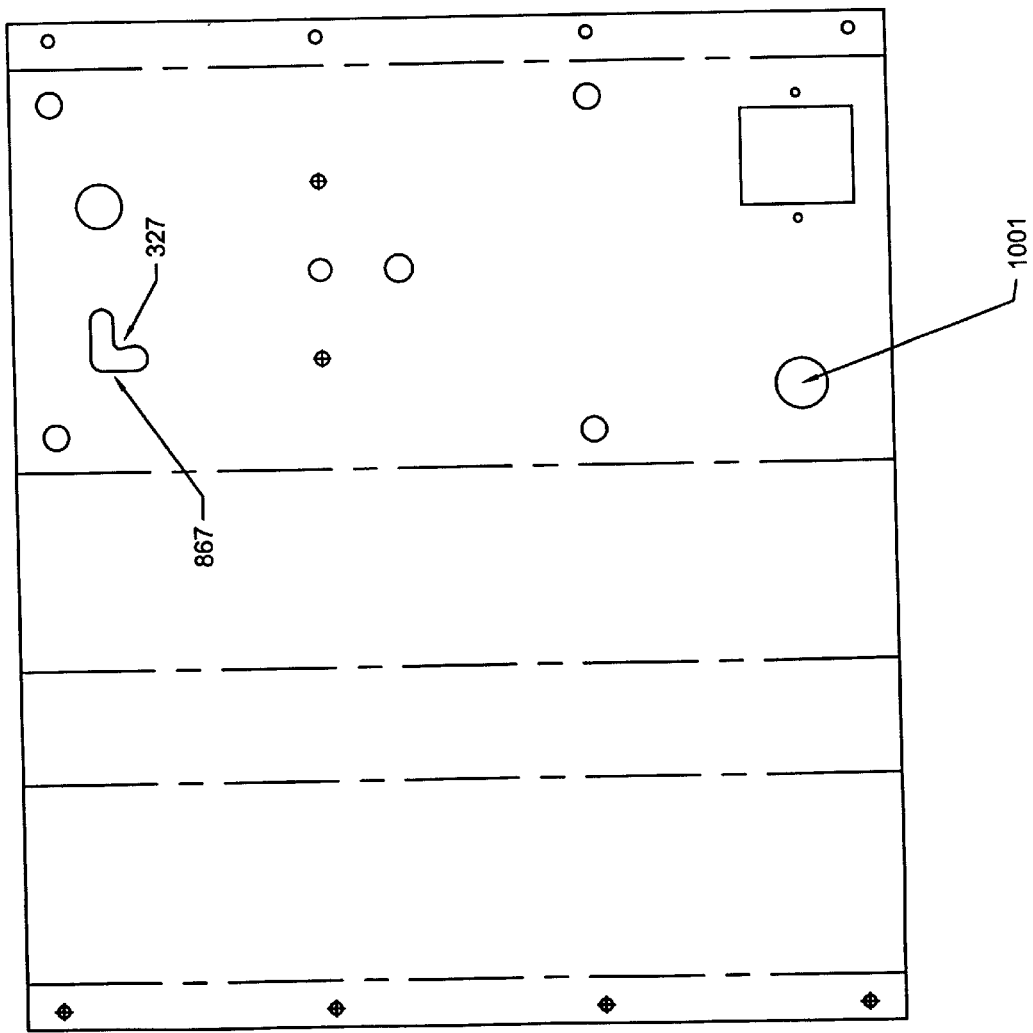
FIG. 10A A diagrammatic front elevational view of the material prior to bending for forming the housing.

FIGS. 8*a* and 8*b* show a horizontal cross-section of the control box and illustrates the working of the clutch mechanism. As can be seen, the clutch controller 861, is connected to a clutch pivot point 862 through an arm 863 that is tensioned through a tensioning means pressing a nut section 864 against the threaded portion of the spindle 865. As shown in the figures, the tensioning means is a simple spring. In FIG. 8*a*, the nut section is engaged into the treads and in FIG. 8*b*, the clutch arm is pivoted disengaging the nut section out of the threads. If an operator engages a single plane weld locking mechanism such as a clutch locks 327 that locks the clutch controller in the disengaged position 866, it would allow single plane welds such as face welds. In this embodiment, one disengages the clutch controller by moving it until the clutch controller moves the nut section 864 out from the spindle support bushing 871 and away from the threaded portion of the spindle 865. Then one may lock the clutch controller in the disengaged state by positioning the clutch controller to abut the clutch lock flange. The clutch controller is connected to a clutch controller hinge, 1101 in FIG. 11, which in turn is connected to the control arm 863, which affects the clutch pivot point. This disengagement results in the extension tube rotating the expandable welding torch axially stationary while being held in position by the spindle ferrule clamp. Regardless, any locking mechanism, such as a clutch lock, that allows an automated welding apparatus' expandable welding torch to remain stationary will allow for single plane welds. Furthermore, a coupling 869 (a ⅛ National Pipe Thread (NPT) coupling is currently used, but other couplings known and used by those skilled in the art may also be used) is attached to the housing's air cooling inlet, 1001 in FIG. 10. The top end of an air line 868 is attached to the coupling. A bottom end of the air line is connected to a compressed air means 872. When the compressed air means is engaged, air is forced into the housing cooling the contents within before escaping from an air escape passage 867. This air cooling conduit and system allows for safer and more reliable operation under harsh and hot environments. The air escape passage forms a clutch lock 327 locking flange, which in this embodiment acts as the clutch lock, through which the clutch controller protrudes and engages. However, the clutch lock need not act as an air escape. Further, the air escape need not act as a clutch lock. An air escape need not be specifically provided as air will escape through various gaps and joints throughout the device. A cooling air flow is provided within the housing resulting in improved performance under extreme temperature conditions.

Figure 2:
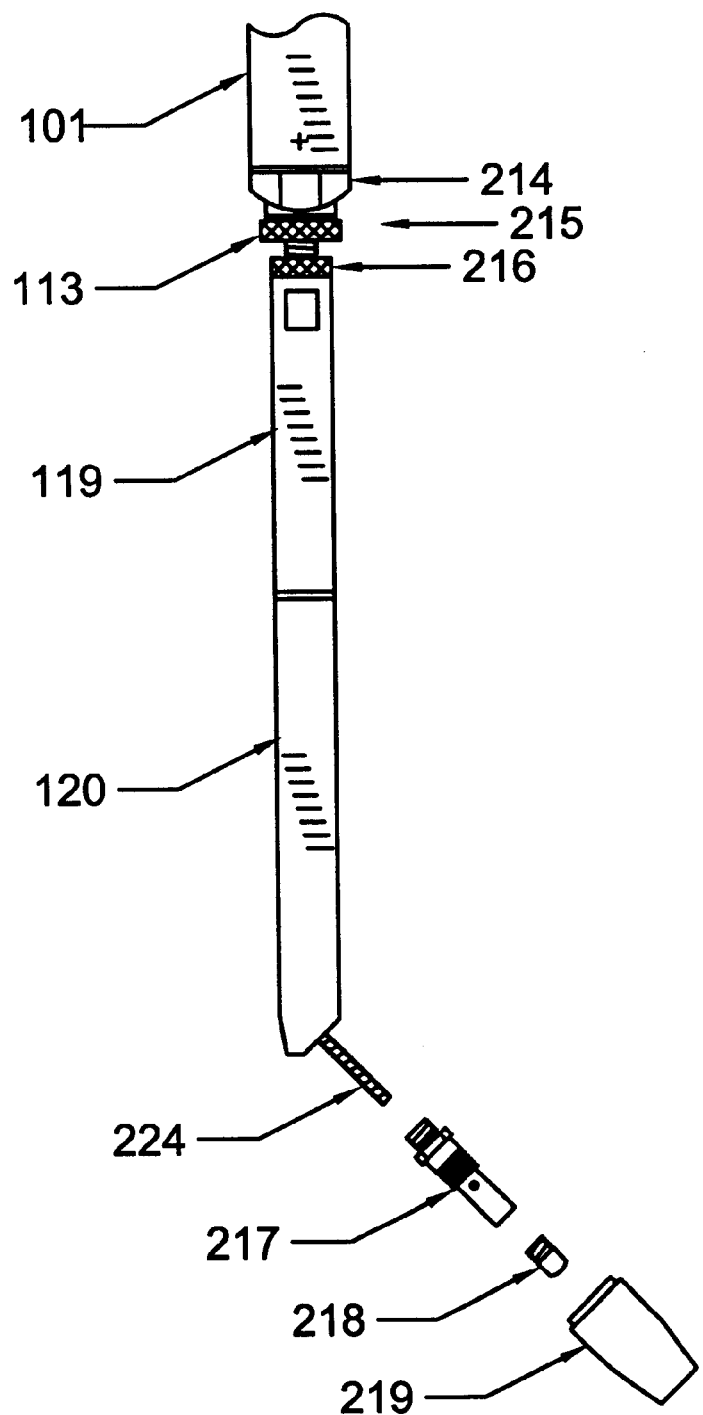
FIG. 2 A view of the lower assembly of the present invention.

The welding materials supply mechanism comprises a welding wire guide liner; an welding current path; and a welding gas conduit. FIG. 2 shows the expandable hollow arm 112 attached to the swivel bearing means 113 and the hollow first arm 101. A liner passes through the first arm, the swivel bearing means 113 and the expandable hollow arm and through a gas diffuser 217 to a welding tip 218 and through the welding nozzle 219. The welding guide liner can be extended by a liner coupler, 1201 in FIG. 12, which attaches to the end of the welding wire guide; another piece welding wire guide liner can be clamped to the guide wire clamp so that the liner coupler will provide a continuous extended conduit when extending the expandable hollow arm. When using the liner coupler to extend the welding guide liner as a necessity for extending the expandable hollow arm, an operator inserts the end of the welding guide liner into the liner coupler, and then an extending piece of welding guide liner in the other end of the coupler until both ends meet within the sight window 1203 and tighten each of set screw 1204, 1205.

The current implementation of the last expandable hollow arm segment 120 ends in a 45 degree angle from which the welding wire guide liner protrudes. Further, the last expandable hollow arm segment has an angled guide wire cavity. 901 in FIG. 9. This angled guide wire cavity in the current implementation 1.2 degrees off from the radial axis. This provides a gentle slope for the welding wire guide liner and prevents wire feed failures from occurring by reducing the likelihood of acute bending and kinking. This implementation increases the reliability of the apparatus in general, and eases and reduces setup time.

The gas diffuser attaches to the last expandable hollow arm segment over the welding wire guide. The welding current runs through the wall of the first hollow arm, the swivel bearing means and the second hollow arm to the nozzle and tip. However, the welding torch is coated with a non-conductive material. Currently, a hard anodizing coating applied to the outside surface approximately 0.0005 inches thick is applied, however, other non-conductive coatings may be used. This coating prevents abrasions and undesirable arcs being struck between the part being welded (negative polarity) and the torch body (positive polarity). Such an arc can potentially damage the torch and end the weld. Such a coating resolves these problems and results in a safer device for operation. Gas is supplied through the first and second hollow tubes to the gas diffuser.

The first hollow arm and expandable welding torch are attached to the swivel hinge 214 and a manual locking coupler 216 and are tightened in the desired position with locking nut 215. Tightening the locking nut will immobilize the swivel hinge so that the welding torch is radially stationary. Tightening the manual locking coupler will secure the expandable hollow arm onto the second point of the swivel bearing means. Allowing a field operator a manual adjustment for securing the expandable welding torch with a manual locking coupler allows for easy and quick set up in the field.

Figure 4:
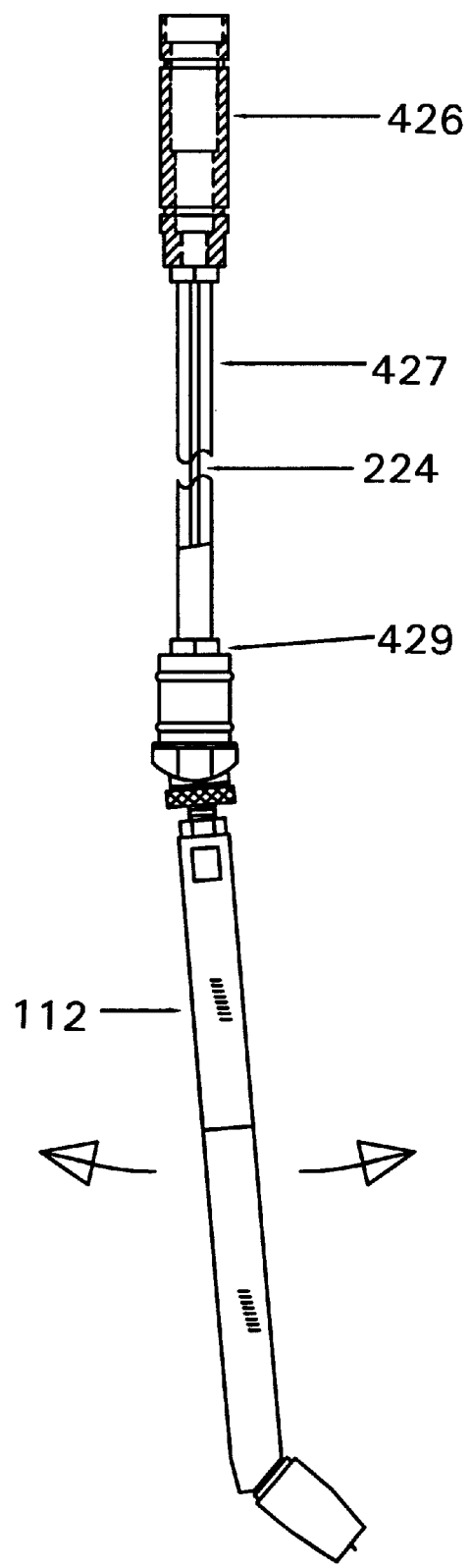
FIG. 4 A view of the present invention's swivel control and lower portion of the welding material supply mechanism.

FIG. 4 shows the rotating portion of the welding materials supply mechanism including the female electrical conductor 426, the hollow first arm wall 427, the flexible, wire conductor 224 and a locking nut 429 for attaching the arm to the swivel bearing.

Figure 5:
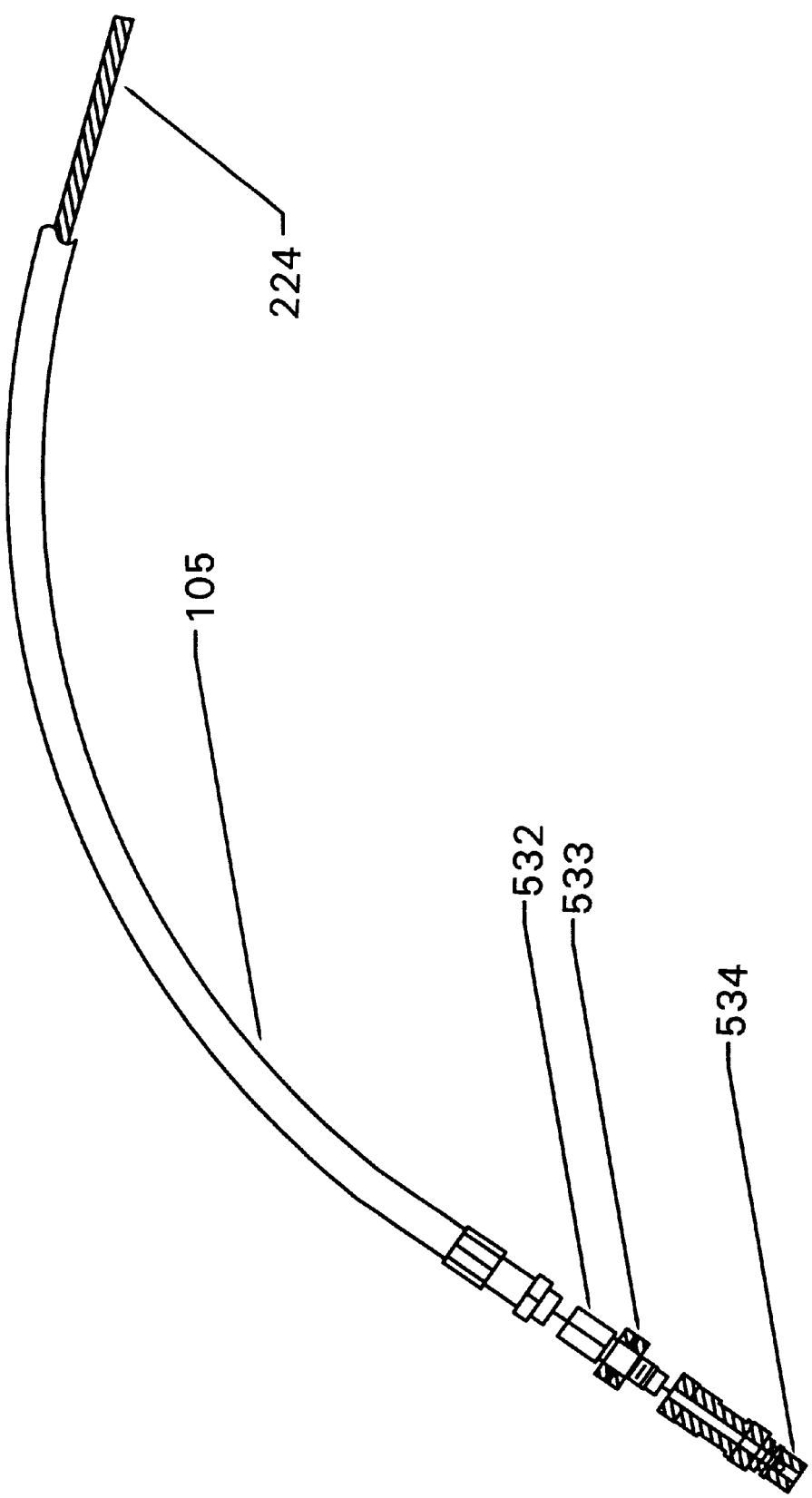
FIG. 5 A diagrammatic partial cross-sectional view of the conduit assembly of the present invention.

FIG. 5 shows wire/power/gas conduit 105 with the wire guide liner 224 attached to an adapter 532, a retainer ring 533 and the stationary current transfer connector (or male electrical connector) 534. It is important to note that the current path in the present invention does not follow an exterior surface until it reaches the swivel bearing. The welding core is carried in the spindle by an extension tube and the welding core is isolated from the extension tube by a plurality of o-rings.

In operation, the apparatus of the present invention may be easily setup, by first positioning the apparatus along the axis of the bore to be rebuilt. This is accomplished by any number of methods. In one method the workpiece is fixed to a stationary object and the axis of the apparatus is aligned with the bore. This may be accomplished initially by sight and then adjusted when the apparatus is setup by adjusting the ball joint anchor and he adjustable brackets. In many instances, the workpiece will include more than one bore that needs to be refurbished. In many instances, such as in construction equipment, there will be two bores that share a common axis. Alignment can be accomplished by use of a rod with two opposing conical slidable attachments (a first and second slidable conical attachments). The first cone is placed into the first bore and the second cone is slid along the rod into the second bore. A portion of the rod passes through the hollow spindle of the apparatus to allow fixturing of the apparatus to both bore axis.

After aligning the apparatus axially, the bore tip can be placed in the desired starting point by releasing the clutch of the apparatus (if the alignment rod was used it is removed and the welding core is slid into the apparatus and fit into the spindle). Upon placement, the welding core is re-engaged to the spindle by engaging the clutch.

The effective radius of the welding core is then adjusted by adjusting the nozzle of the expandable welding torch to an optimal working distance by swiveling the second arm of the welding core through the swivel bearing means.

In operation, after the apparatus has been aligned along the axis of the bore, the welding torch has been adjusted for radius and initial starting position by engaging the spindle at the correct axial position and swinging the welding torch into working position by pivoting through the swivel bearing, the apparatus starts its operation. The spindle is rotated about is I axis and welding materials (welding current, welding wire and welding gas) are supplied through the welding core to the welding torch which then deposits a strip of metal to the inner bore surface as the torch rotates around the inner circumference of a bore. Because the spindles axial position is a function of the clutch mechanism's contact with the threaded screw portion of the spindle, as the spindle rotates its axial position changes. The screw portions thread density determined the number of spirals per inch that the torch moves. A spiral pattern of material is built up on the inner bore surface. When the desired portion of the bore is built up, the process is shut off. Clearly, the bore can also be built up with several layers by repeating the above process.

The removable welding core of the present invention, showing in FIG. 4 and FIG. 5, is comprised of a first hollow arm rotatable along a radial axis; a swivel bearing means attached at a first point to the first hollow arm aligned on said radial axis; and a second hollow arm attached to a second point of said swivel bearing means so as to be disposed away from said radial axis where said first hollow arm attaches to a rotatable electrical connector comprising a first female portion and a second male portion wherein the electrical contact is formed between an outer radial surface of said male portion and an inner surface of said female portion and the male portion connects to flexible conduit that carries the welding wire and welding wire conduit, a conduit to transport the welding gas mixture and an electrical conductor. This welding core is insertable and removable from the control and rotation controller; this controller comprises a hollow spindle; a drive mechanism for rotating the hollow spindle; and fixturing means for holding the welding core. Specifically the controller further comprises a manual clutch mechanism for allowing slideable adjustment along the axis of rotation and a screw mechanism that coordinates the axial and radial movement of the spindle. The spindle may be connected to the welding core through electrically insulated means in order to isolate the spindle from electrical current and minimize the exposure of welding current to the lower portion of the welding core.

Figure 6:
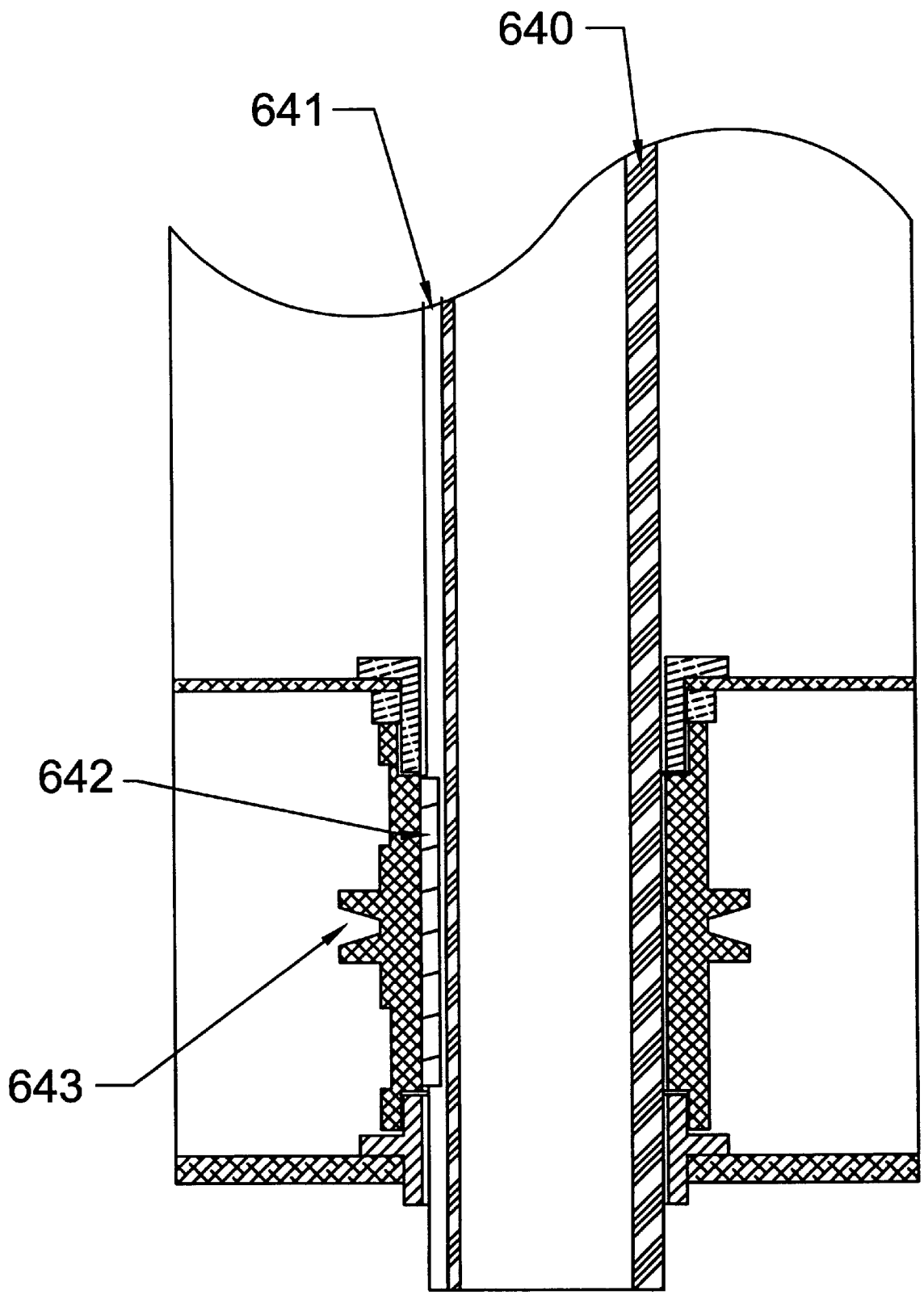
FIG. 6 A cross-sectional view of the hollow spindle assembly.

FIG. 6 shows the spindle assembly which is comprised of the spindle tube 640, a keyway 641 disposed on the exterior surface of the spindle tube, a key 642 disposed in said key, a pulley 643 fixed to said key and positioning means. The drive v-belt, 751 in FIG. 7, runs around the pulley 643 and the motor pulley, 752 in FIG. 7.

Figure 7:
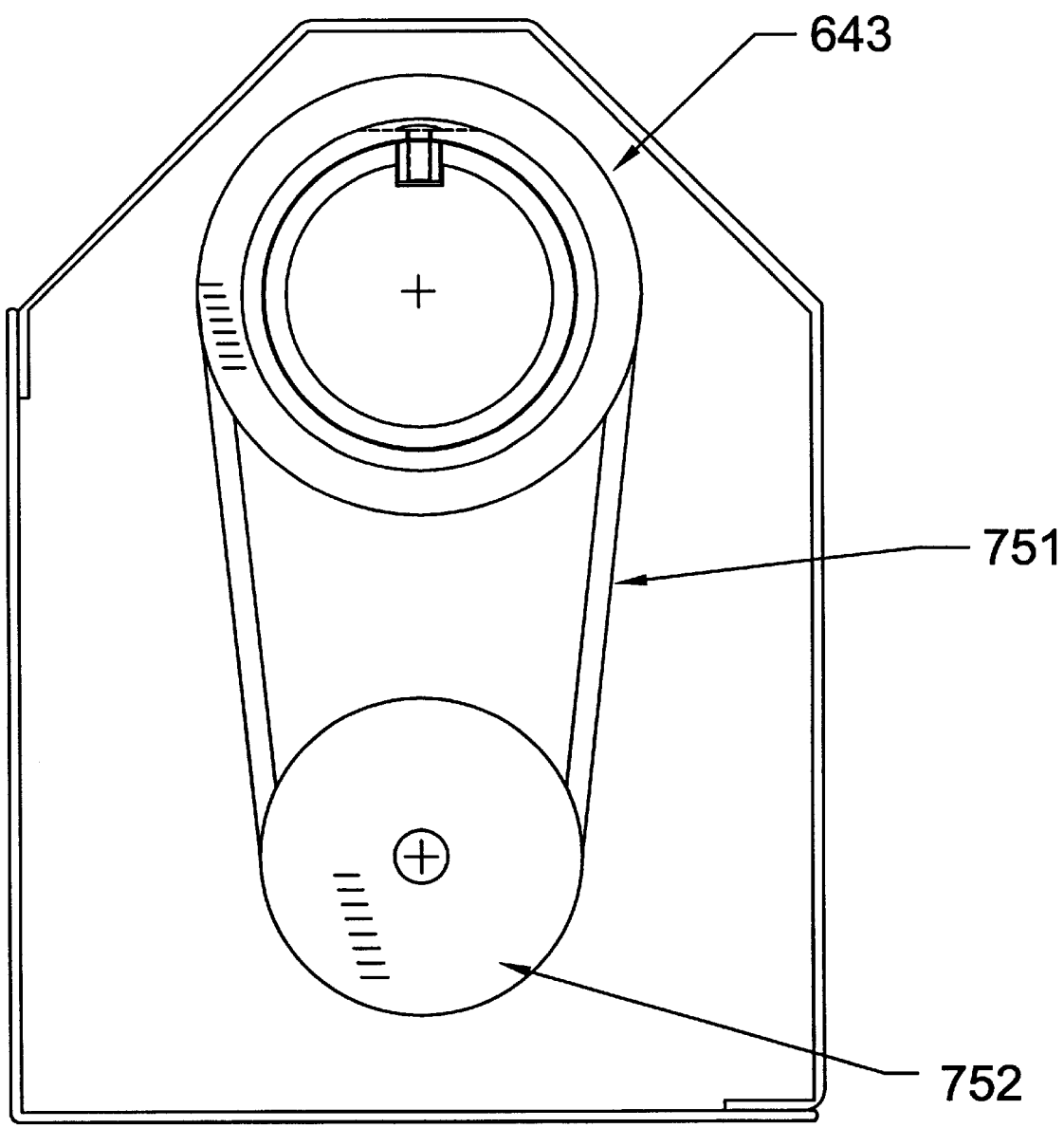
FIG. 7 A top plan view of the motor-pulley assembly.

FIG. 7 shows a top plan view of the motor-pulley, v-belt and spindle drive pulley. The figure also shows the spindle, with the key and keyway with the spindle bushing disposed between spindle and the spindle drive pulley.

One of the advantages of the invention is that it may be easily assembled, disassembled and positioned. Because the system is dedicated to specific applications, it is relatively light and is capable of being easily transported. It is configured to use existing welding equipment of a particular user and is because of its dedicated purpose an easier system to maintain.

Having now described the an embodiment of the invention, it should be apparent to those skilled in the art that the foregoing is merely illustrative and not limiting, having been presented by way of example only. Numerous modifications and other embodiments are within the scope of one of ordinary skill in the art and are contemplated as falling within the scope of the invention as defined by the appended claims. The preferred embodiments have been disclosed in the foregoing.

What is claimed is:

1. An apparatus for providing a weld bead on a desired surface, the apparatus comprising:

a first hollow arm being connected to a second hollow arm by a swivel bearing, and a remote end of the second hollow arm supporting a nozzle surrounding a welding tip to facilitate welding on a surface;

a hollow spindle having opposed first and second open ends with the second open end of the spindle supporting the first hollow arm, and at least a first portion of an exterior surface of the spindle having a thread formed thereon;

a drive coupled to the spindle for supplying rotational drive to the spindle and causing rotation thereof;

a clutch located adjacent the exterior threaded surface of the spindle;

a housing accommodating the clutch, the drive and at least a portion of the spindle; and the clutch having an engaged position in which the clutch engages with the exterior threaded surface of the spindle to cause axial movement of the spindle, relative to the housing, when the spindle is rotated by the drive, to facilitate the nozzle depositing a spiral weld bead on the desired surface to be welded, and a disengaged position in which the clutch is sufficiently spaced from the exterior threaded surface of the spindle such that the spindle is axially movable relative to the housing, and the clutch has a locking mechanism for locking the clutch in the disengaged position.

2. The apparatus for providing the weld bead according to claim 1, wherein the swivel bearing facilitates a pivoting movement of the second hollow arm relative to the first hollow arm to adjust a diameter of the weld bead to be formed on the desired surface.

3. The apparatus for providing the weld bead according to claim 1, wherein a locking coupler facilitates locking an adjusted position of the second hollow arm relative to the first hollow arm.

4. The apparatus for providing the weld bead according to claim 1, wherein the housing is coupled to a mounting rod by a support bracket, and the housing and the support bracket are slideable along the mounting rod to adjust an axial position of the housing relative to the desired surface to be welded.

5. The apparatus for providing the weld bead according to claim 1, wherein the second open end of the spindle supporting the first hollow arm has a bracket and the bracket facilitates adjustable relative movement of the first hollow arm relative to the spindle.

6. The apparatus for providing the weld bead according to claim 1, wherein the exterior threaded surface of the spindle has between 6 and 12 threads per inch.

7. The apparatus for providing the weld bead according to claim 1, wherein the housing includes a controller coupled to the drive for controlling at least one of a rotational speed of the spindle and a rotational direction of the spindle during operation of the apparatus.

8. The apparatus for providing the weld bead according to claim 1, wherein the clutch comprises a clutch control mechanism and the clutch control mechanism comprises a clutch arm which supports a threaded nut section, located for engagement with a desired section of the exterior threaded surface of the spindle, a first end of the clutch arm is pivotally attached to the housing and a second end of the clutch arm supports a control knob, the clutch arm is biased by a spring toward engagement with the threaded portion of the spindle.

9. The apparatus for providing the weld bead according to claim 1, wherein the first clamp is provided adjacent the first open end of the spindle and a second clamp is provided adjacent the second open end of the spindle for coupling the spindle to the first hollow arm.

10. The apparatus for providing the weld bead according to claim 1, wherein a first clamp is provided adjacent the first open end of the spindle and, when the spindle is in a vertical arrangement and the clutch is retained by the locking mechanism in the disengaged position out of engagement with the exterior threaded surface of the spindle, the spindle is free to move in a vertical downward direction until the first clamp engages with an exterior surface of the housing and thereafter the first clamp maintains the spindle in a fixed axial position relative to the housing to facilitate welding by the nozzle in a horizontal plane when the drive supplies rotational drive to the spindle and causes rotation thereof.

11. The apparatus for providing the weld bead according to claim 1, wherein a second portion of the exterior surface of the spindle is coupled to a pulley and the drive supports a mating pulley and a belt couples the pulley of the spindle to the pulley of the drive to facilitate supplying rotational energy from the drive to the spindle.

12. The apparatus for providing the weld bead according to claim 1, wherein:
 a female electrical connector is attached to a transfer tube coupled to the swivel bearing;
 the transfer tube establishes a transfer tube electrical current path from the female electrical connector to the welding tip via the swivel bearing and the second hollow arm;
 a transfer tube wire guide liner is located within the transfer tube for supplying a welding wire to the nozzle, via the swivel bearing and the second hollow arm; and
 a transfer tube gas conduit, defined between an exterior surface of the wire guide liner and an inwardly facing surface of the transfer tube, supplies the welding gas to the nozzle via the swivel bearing and the second arm.

13. The apparatus for providing the weld bead according to claim 12, wherein:
 a first end of a conduit is received within the first hollow arm, the conduit contains a conduit wire guide liner for supplying the welding wire, a gas supply conduit for supplying the welding gas, and a conduit electrical current path for supplying a welding current; and
 the first end of the conduit has a mating male electrical connector for engagement with the female electrical connector of the transfer tube; and upon the female and male electrical connectors engaging one another, the conduit wire guide liner is aligned with the transfer tube wire guide liner to facilitate conveying the welding wire to the nozzle, the conduit gas supply conduit is aligned with the transfer tube gas conduit to facilitate conveying the welding gas to the nozzle, and the conduit electrical current path is coupled to the transfer tube current path to facilitate conveying the welding current to the nozzle.

14. The apparatus for providing the weld bead according to claim 13, wherein a second end of the conduit is provided with a coupling for connecting the conduit to a supply of welding gas, to an electrical supply for supplying the welding current and a supply of welding wire.

15. The apparatus for providing the weld bead according to claim 13, wherein both the conduit and the mating male electrical connector remain stationary with respect to the housing while the female electrical connector and the first hollow arm rotate with the spindle when the spindle is driven by the drive.

16. The apparatus for providing the weld bead according to claim 12, wherein the transfer tube and the second hollow arm are sufficiently hollow to supply the welding wire and the welding gas to the nozzle and, the swivel bearing and the second hollow arm are sufficiently electrically conductive to supply a welding current to the welding tip to facilitate welding of the desired surface.

17. The apparatus for providing a welding bead according to claim 1, wherein the second hollow arm comprises at least two segments and the two segments are joined together end to end with one another.

18. The apparatus for providing a welding bead according to claim 1, wherein the apparatus includes a compressed air source coupled to the housing by an air line for providing cooling air to the housing during operation of the apparatus.

19. The apparatus for providing a welding bead according to claim 1, wherein an exterior surface of each of the first hollow arm, the swivel bearing and the second hollow arm is coated with a hard anodized coating.

20. The apparatus for providing a welding bead according to claim 19, wherein the anodized coating is approximately 0.0005 inch thick.

* * * * *

UNITED STATES PATENT AND TRADEMARK OFFICE
CERTIFICATE OF CORRECTION

PATENT NO. : 6,284,995 B1
DATED : September 4, 2001
INVENTOR(S) : Erik Nathan Esslinger and Thomas H. Esslinger It is certified that error appears in the above-identified patent and that said Letters Patent is hereby corrected as shown below:

<u>Title page,</u>
Please add:

-- Related U.S. Application Data
[63]   Continuation-in-Part of application No. 09/421,206, filed on Jul. 21, 1998
[60]   Provisional application No. 60/053,388, filed on July 22, 1997. --

Signed and Sealed this

Twenty-fourth Day of December, 2002

JAMES E. ROGAN
*Director of the United States Patent and Trademark Office*